(12) United States Patent
Kuzuhara et al.

(10) Patent No.: US 11,275,241 B2
(45) Date of Patent: Mar. 15, 2022

(54) HEAD-UP DISPLAY AND MOVING OBJECT EQUIPPED WITH HEAD-UP DISPLAY

(71) Applicant: Panasonic Intellectual Property Management Co., Ltd., Osaka (JP)

(72) Inventors: Satoshi Kuzuhara, Osaka (JP); Hiroaki Okayama, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/123,627

(22) Filed: Dec. 16, 2020

(65) Prior Publication Data

US 2021/0103144 A1 Apr. 8, 2021

Related U.S. Application Data

(63) Continuation of application No. PCT/JP2019/007250, filed on Feb. 26, 2019.

(30) Foreign Application Priority Data

Jun. 27, 2018 (JP) .............................. JP2018-122314

(51) Int. Cl.
*G02B 27/01* (2006.01)
*B60K 35/00* (2006.01)

(52) U.S. Cl.
CPC .......... *G02B 27/0101* (2013.01); *B60K 35/00* (2013.01); *B60K 2370/1529* (2019.05); *G02B 2027/0123* (2013.01)

(58) Field of Classification Search
CPC ... G02B 27/01–0189; G02B 2027/0105–0198; G03B 21/00–64; H04N 9/31–3197; B60K 35/00
See application file for complete search history.

(56) References Cited

U.S. PATENT DOCUMENTS

| 5,748,377 A | 5/1998 | Matsumoto et al. |
| 2018/0017790 A1* | 1/2018 | Kuzuhara ............. B60K 37/02 |

(Continued)

FOREIGN PATENT DOCUMENTS

| EP | 3 035 105 | 6/2016 |
| JP | 9-179060 | 7/1997 |

(Continued)

OTHER PUBLICATIONS

Extended European Search Report dated Jun. 30, 2021 in European Patent Application No. 19826989.6.

(Continued)

*Primary Examiner* — Michelle M Iacoletti
*Assistant Examiner* — Christopher A Lamb, II
(74) *Attorney, Agent, or Firm* — Wenderoth, Lind & Ponack, L.L.P.

(57) ABSTRACT

A head-up display displays an image as a virtual image to an observer and includes: a display device to display the image; and a projection optical system to enlarge and project the image. The projection optical system includes first and second optical elements arranged in this order in an optical path from the image. The first optical element has a diverging action stronger in a horizontal direction than in a vertical direction. The second optical element has a converging action stronger in the horizontal direction than in the vertical direction. A combined power of the first and second optical elements is larger in the vertical direction than in the horizontal direction. The virtual image is inclined by 45 degrees or more with respect a line of sight of the observer to have a lower end close to the observer and an upper end far from the observer.

10 Claims, 4 Drawing Sheets

(56) References Cited

U.S. PATENT DOCUMENTS

2018/0299672 A1   10/2018   Yatsu et al.
2018/0356641 A1   12/2018   Morohashi et al.
2019/0225083 A1    7/2019   Yatsu et al.

FOREIGN PATENT DOCUMENTS

| JP | 2017-206191 | 11/2017 |
|----|-------------|---------|
| WO | 2016/208196 | 12/2016 |
| WO | 2017/061040 | 4/2017  |
| WO | 2017/094427 | 6/2017  |
| WO | 2018/020678 | 2/2018  |
| WO | 2018/066062 | 4/2018  |

OTHER PUBLICATIONS

Translation of the International Preliminary Report on Patentability dated Dec. 30, 2020 in International (PCT) Application No. PCT/JP2019/007250.
International Search Report dated May 28, 2019 in International (PCT) Application No. PCT/JP2019/007250.

\* cited by examiner

HEAD-UP DISPLAY AND MOVING OBJECT EQUIPPED WITH HEAD-UP DISPLAY

CROSS-REFERENCE TO RELATED APPLICATIONS

The present application is a continuation of PCT/JP2019/007250 filed Feb. 26, 2019, which claims priority to Japanese Patent Application No. 2018-122314, filed on Jun. 27, 2018, the entire contents of which are incorporated herein by reference.

TECHNICAL FIELD

The present disclosure relates to a head-up display.

BACKGROUND ART

JP 2017-206191 A discloses a technique of inclining a first virtual image significantly as compared with a second virtual image in order to allow a driver to correctly perceive that the first and second virtual images disposed three-dimensionally are independent of each other in a head-up display.

However, when a virtual image is inclined in a head-up display as in JP 2017-206191 A, there has been a problem that a use region in a vertical direction of a display device displaying an image is widened and size of the display device is increased. Further, a virtual image with excellent image quality cannot be presented by simply reducing the size of the display device in the vertical direction, because there is a limit in an optical aberration characteristic. In view of the above, the present disclosure provides a head-up display capable of being downsized yet presenting a virtual image with excellent image quality.

SUMMARY

A head-up display according to the present disclosure is a head-up display for displaying an image as a virtual image to an observer. The head-up display includes a display device configured to display the image, and a projection optical system configured to enlarge and project the image. The projection optical system includes a first optical element and a second optical element arranged in this order in an optical path from the image, the first optical element has a diverging action that is stronger in a horizontal direction than in a vertical direction, and the second optical element has a converging action that is stronger in the horizontal direction than in the vertical direction.

In the head-up display in the present disclosure, an image size of the display device can be made smaller in the vertical direction where a focal length is short and made larger in the horizontal direction where a focal length is long. Therefore, even in a case where the virtual image is inclined with respect to the line of sight of the observer, it is possible to prevent an increase in the size of the display device in the vertical direction and to downsize the display device.

DETAILED DESCRIPTION

Hereinafter, an embodiment will be described in detail with reference to the drawings as appropriate. However, description that is detailed more than necessary may be omitted. For example, detailed description of an already well-known matter and redundant description of substantially the same configuration may be omitted. This is to avoid unnecessary redundancy in the description below and to facilitate understanding of those skilled in the art.

Note that the inventor(s) provide the accompanying drawings and the description below so that those skilled in the art can fully understand the present disclosure, and do not intend to limit the subject matter described in claims by these drawings and description.

First Embodiment

Hereinafter, a first embodiment will be described with reference to FIGS. 1 to 3.
[1-1. Configuration]
[1-1-1. Overall Structure of Head-Up Display]
A specific embodiment and example of a head-up display 100 of the present disclosure will be described below with reference to the drawings.

Figure 1:
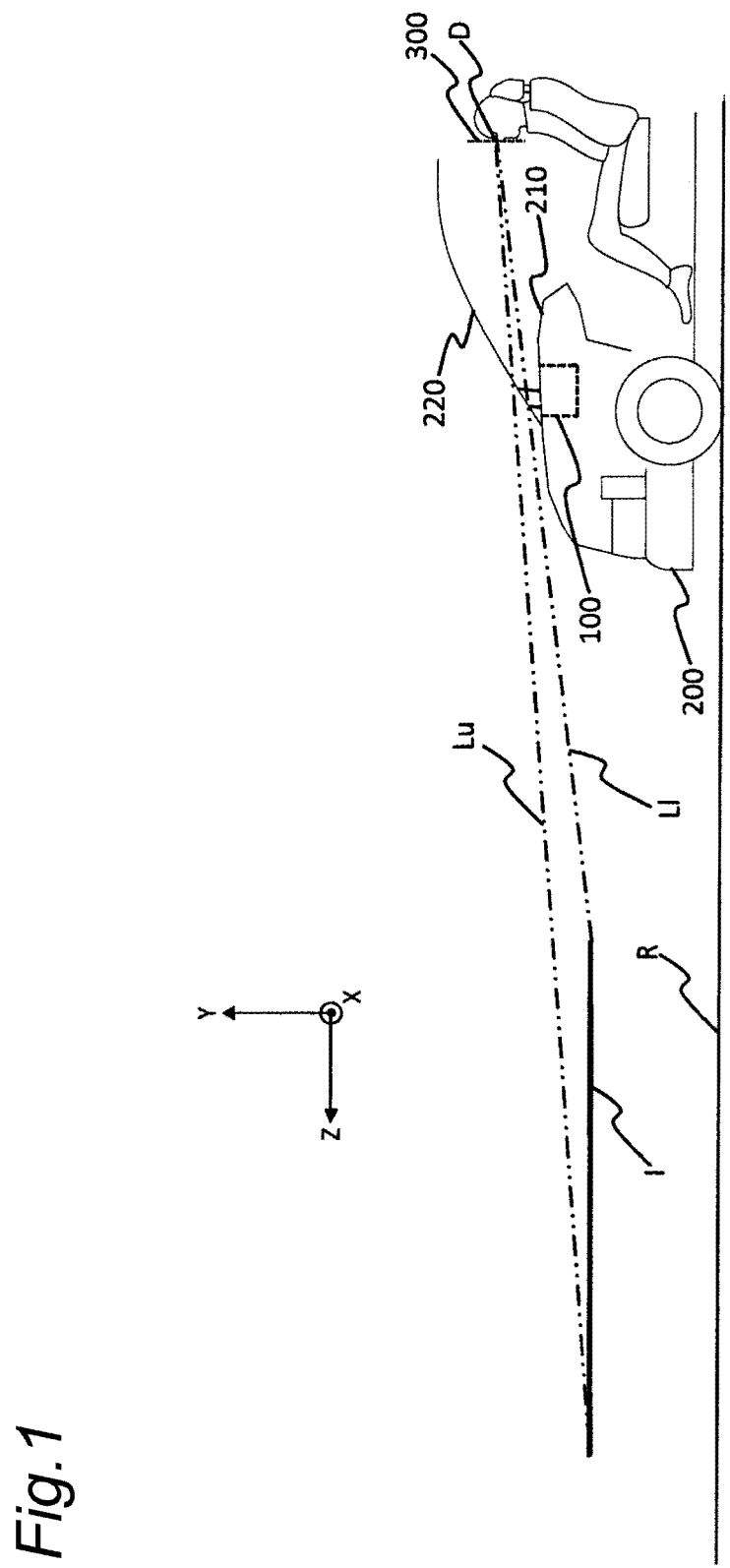
FIG. 1 is a diagram showing a cross section of a vehicle equipped with a head-up display according to a first embodiment.

FIG. 1 is a diagram showing a cross section of a vehicle 200 equipped with the head-up display 100 according to the present disclosure. As shown in FIG. 1, the head-up display 100 is disposed inside a dashboard 210 below a windshield 220 of the vehicle 200. An observer D perceives an image projected from the head-up display 100 as a virtual image I.

In the present embodiment, the virtual image I is displayed along a road surface R. By displaying the virtual image I along the road surface R as described above, natural augmented reality (AR) display with a sense of depth can be realized, and cognitive ability of a driver can be improved.

Figure 2:
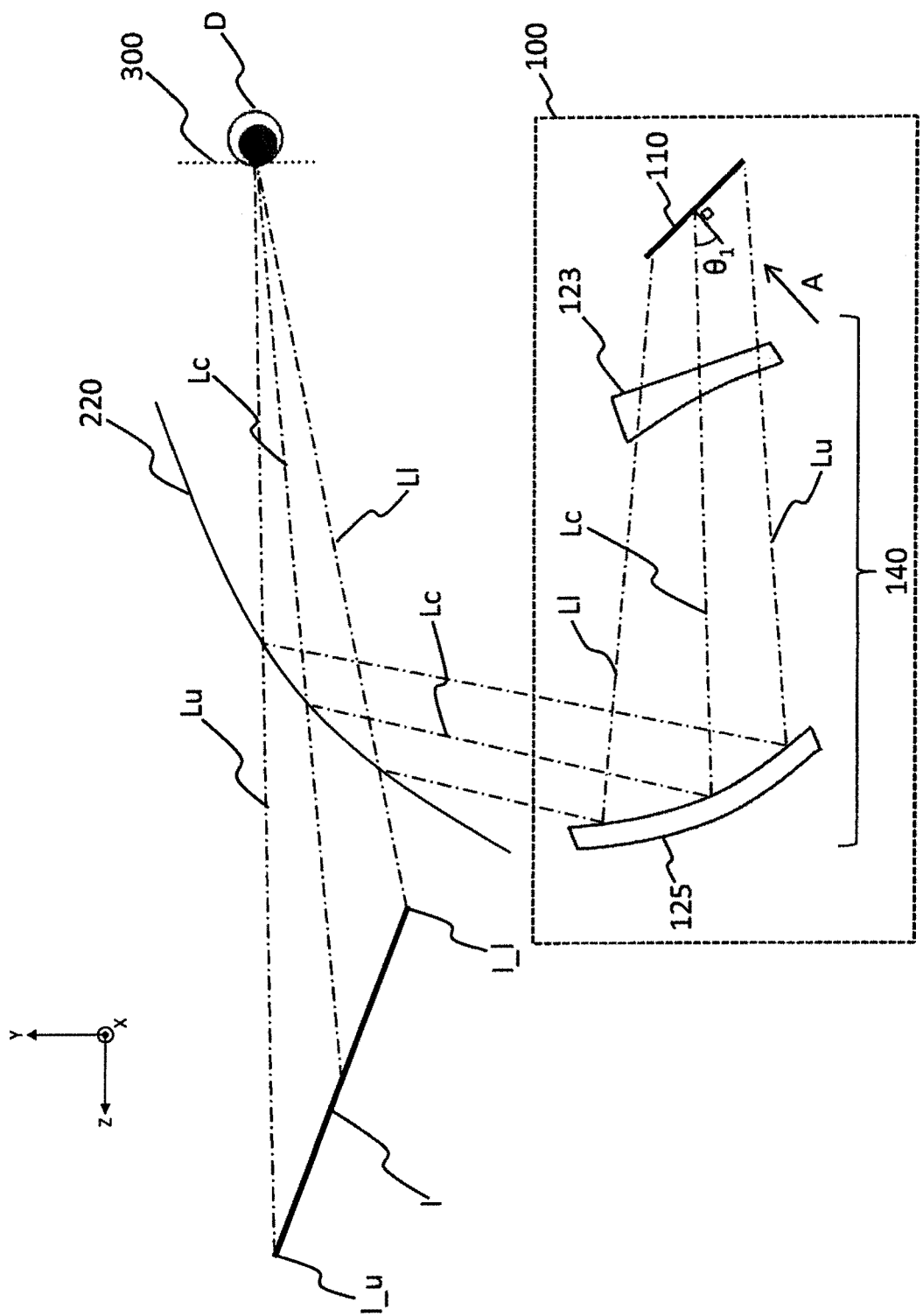
FIG. 2 is a schematic diagram showing a configuration of the head-up display according to the first embodiment.
Figure 3A:
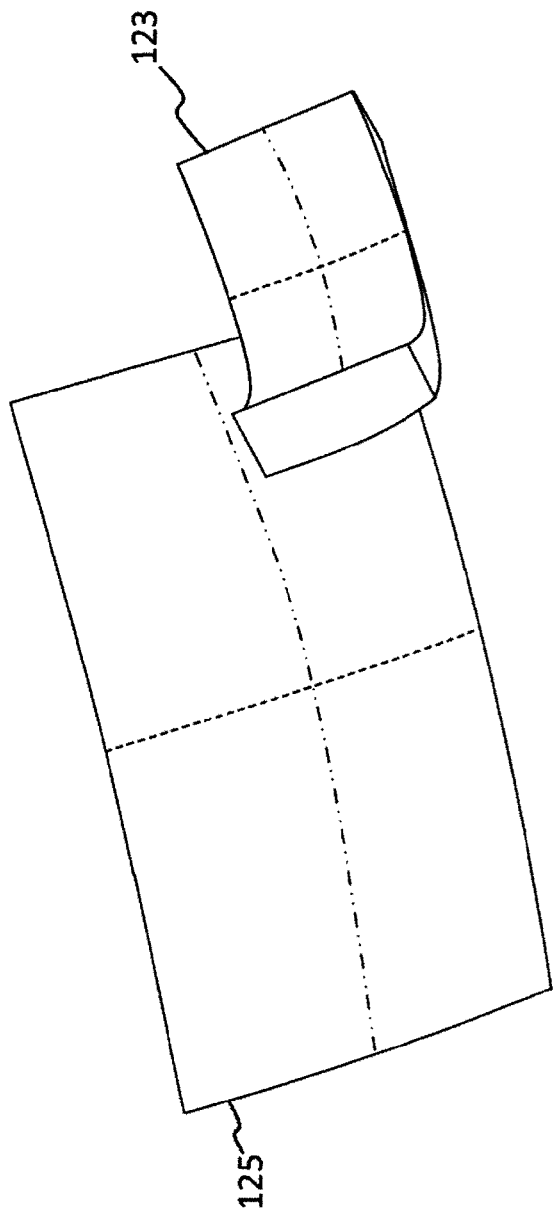
FIG. 3A is a schematic diagram for explaining a projection optical system of the head-up display according to the first embodiment.
Figure 3B:
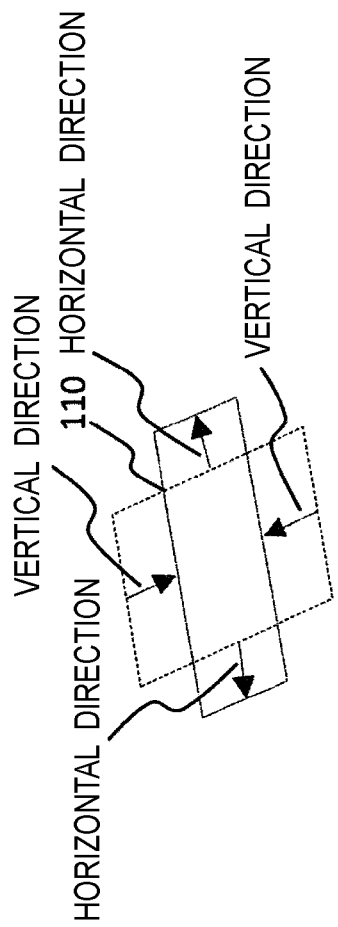
FIG. 3B is a schematic diagram for explaining an image size of a display device in the first embodiment.

FIG. 2 is a schematic diagram showing a configuration of the head-up display 100 according to the present embodiment. FIG. 3A is a schematic diagram for explaining a projection optical system of the head-up display 100 according to the present embodiment, and FIG. 3B is a schematic diagram for explaining a size of a display device 110.

As shown in FIG. 2, the head-up display 100 includes a display device 110 and a projection optical system 140. In the head-up display 100, the display device 110 is an optical member having a diffusion characteristic, and the head-up display 100 projects an image displayed on the display device 110 onto a windshield 220 via the projection optical system 140. Projected light is reflected by the windshield 220 and guided to a viewpoint region 300 of the observer D. In this manner, the head-up display 100 makes the observer D visually perceive the virtual image I. Here, a viewpoint is a principle point of an eye of the observer D in a case where the eye is considered as a lens, and the viewpoint region 300 is a region where the viewpoint of the observer D which allows the observer D to visually perceive the virtual image I completely is positioned.

Here, in the present disclosure, a forward direction is a direction from the observer D toward the windshield 220 of the vehicle 200. A rearward direction is an opposite direction from the forward direction. A lower direction is a direction from the vehicle 200 toward the road surface R on which the vehicle 200 travels. An upper direction is an opposite direction from the lower direction. An inward direction is a direction from the observer D in the driver's seat toward a passenger seat. An outward direction is an opposite direction from the inward direction.

As shown in FIG. 2, among light beams emitted from the display device 110 and reaching a center of the viewpoint region 300, a light beam corresponding to an upper end I_u of the virtual image I is defined as an upper light beam Lu, and a light beam corresponding to a lower end I_l of the virtual image I is defined as a lower light beam Ll. Further, among light beams emitted from the display device 110, a light beam that passes through a central portion of the virtual image I and reaches the center of the viewpoint region 300 is defined as a reference light beam Lc. That is, when viewed from the observer D, the reference light beam Lc corresponds to an optical path from a center of the virtual image I to the viewpoint of the observer D. Actually, the reference light beam Lc visually perceived by the observer D is a light beam that reaches the observer D from the display device 110 via the optical system. For this reason, light beams corresponding to the reference light beam Lc emitted from the center of the virtual image I and reaching the observer D from the display device 110 each are also expressed as the reference light beam Lc. Further, optical paths corresponding to these light beams are similarly expressed as the reference light beam Lc. However, it is assumed that the viewpoint of the observer D is at the center of the viewpoint region 300.

The display device 110 displays a display image under the control of a control unit such as a CPU (not shown). As the display device 110, for example, a liquid crystal display device with a backlight, an organic light-emitting diode, a plasma display, or the like can be used. Further, as the display device 110, a screen that diffuses or reflects light and a projector or a scanning laser may be used to generate an image. The display device 110 can display various pieces of information such as road progress guidance display, a distance to a vehicle in front, a remaining amount of a vehicle battery, and a current vehicle speed. Further, the display device 110 can electronically distort an image in advance according to the distortion generated in the projection optical system 140 or the windshield 220 or the position of the observer D acquired by a camera (not shown), so as to allow the observer D to visually perceive the excellent virtual image I. Further, the display device 110 can display displayed pixels of a plurality of wavelengths as if the displayed pixels are shifted depending on their respective display positions in advance according to the chromatic aberration generated in the projection optical system 140, so as to allow the observer D to visually perceive the excellent virtual image I.

The projection optical system 140 includes a free-form surface lens 123 as a first optical element having negative power and a free-form surface mirror 125 as a second optical element having positive power. Here, having the negative power means having a diverging action, and having the positive power means having a converging action. The projection optical system 140 projects an image enlarged by the free-form surface lens 123 onto the windshield 220 by reflecting the image on the free-form surface mirror 125.

In the present embodiment, the virtual image I is inclined with respect to the line of sight of the observer D and is displayed along the road surface R. In order to display the virtual image I in an inclined manner as described above, the display device 110 is disposed to be inclined by an angle $|\theta_1|$ counterclockwise with respect to the reference light beam Lc, as shown in FIG. 2.

[1-1-2. Configuration of Projection Optical System]

In the projection optical system 140, the free-form surface lens 123 having negative power and the free-form surface mirror 125 having positive power are disposed in this order in an optical path from the display device 110. The projection optical system 140 is an optical system called a telephoto type including the free-form surface lens 123 and the free-form surface mirror 125.

In the present embodiment, the free-form surface lens 123 is formed so that a diverging action is stronger in a horizontal direction indicated by the chain double-dashed line than in a vertical direction indicated by the dotted line in FIG. 3A. Further, the free-form surface mirror 125 is formed so that a converging action is stronger in the horizontal direction indicated by the chain double-dashed line than in the vertical direction indicated by the dotted line in FIG. 3A.

With this configuration, in the vertical direction, a telephoto action by the free-form surface lens 123 and the free-form surface mirror 125 becomes weaker and this leads to a short focal point. Therefore, the combined power can be increased. For this reason, the magnification is increased, and size in the vertical direction of the image displayed on the display device 110 can be reduced. Further, in the horizontal direction, a telephoto action by the free-form surface lens 123 and the free-form surface mirror 125 becomes stronger and this leads to a long focal point. Therefore, the combined power can be reduced. For this reason, the magnification is lowered, and size in the horizontal direction of the image displayed on the display device 110 can be increased.

When power in the horizontal direction of the free-form surface lens 123 is P1X and power in the vertical direction of the free-form surface lens 123 is P1Y, the free-form surface lens 123 is formed to satisfy the following conditional expression (1):

$$1.0 < P1X/P1Y < 1.5 \qquad (1)$$

Further, when power in the horizontal direction of the free-form surface mirror 125 is P2X and power in the vertical direction of the free-form surface mirror 125 is P2Y, the free-form surface mirror 125 is formed to satisfy the following conditional expression (2):

$$1.0 < P2X/P2Y < 2.0 \qquad (2)$$

By using the projection optical system 140 as described above, the image size of the display device 110 can be made smaller in the vertical direction with a short focal length and can be made larger in the horizontal direction with a long focal length, as shown in FIG. 3B. Therefore, even in a case where the virtual image I is inclined with respect to the line of sight of the observer D, it is possible to prevent an increase in the size of the display device 110 in the vertical direction and to reduce the size of the display device 110. Here, the state in which the virtual image I is inclined with respect to the line of sight of the observer D means a state in which the display device 110 is inclined counterclockwise with respect to the reference light beam Lc by an angle $|\theta_1|$ as shown in FIG. 2.

In the present embodiment, the relationship between size of an image displayed by the display device 110 and a field of view is set as described below.

When a horizontal field of view of the virtual image I in the present embodiment is XF, a vertical field of view of the virtual image is YF, a horizontal display size of the image on the display device 110 is XI, and a vertical display size of the image on the display device 110 is YI, the following conditional expression (3) is satisfied:

$$0.62<(XI\times YF)/(YI\times XF)<0.90 \qquad (3)$$

When an aspect ratio of the field of view is expressed by XF/YF and an aspect ratio of the display image is expressed by XI/YI, the conditional expression (3) above is expressed as a ratio of the aspect ratio of the display image to the aspect ratio of the field of view. Hereinafter, the ratio will be referred to as "the ratio of the aspect ratios".

As described above, in the projection optical system 140 of the present embodiment, there is a difference in focal length between the vertical direction and the horizontal direction. An upper limit of the ratio of the aspect ratios is preferably set to 1. However, the closer the ratio of the aspect ratios is to 1, the larger the difference in focal length between the vertical direction and the horizontal direction, and the aberration characteristic limit is reached. Specifically, as the ratio of the aspect ratios becomes larger, the effect of eccentric astigmatism becomes larger. In view of the above, in the present embodiment, the upper limit of the ratio is set to 0.90 so that a virtual image with excellent image quality can be presented.

Further, when the ratio of the aspect ratios becomes small, the display device 110 becomes large. In view of the above, in the present embodiment, a lower limit of the ratio of the aspect ratios is set to 0.62, so as to prevent an increase in the size of the display device 110.

As described above, in the projection optical system 140 in the present embodiment, the free-form surface lens 123 is configured to have a stronger diverging action in the horizontal direction than in the vertical direction, and the free-form surface mirror 125 is configured to have a stronger converging action in the horizontal direction than in the vertical direction. As a result, it is possible to provide the head-up display 100 capable of being downsized yet presenting the virtual image I with excellent image quality, even in a case where the display device 110 is inclined by the inclination angle $|\theta_1|$ with respect to the reference light beam Lc.

[1-2. Advantageous Effect and the Like]

The head-up display 100 as an example of the head-up display according to the first embodiment displays an image as the virtual image I to the observer D. The head-up display 100 includes the display device 110 configured to display the image and the projection optical system 140 configured to enlarge and project the image. The projection optical system 140 includes the free-form surface lens 123 and the free-form surface mirror 125 arranged in this order in the optical path from the image. The free-form surface lens 123 has a stronger diverging action in the horizontal direction than in the vertical direction, and the free-form surface mirror 125 has a stronger converging action in the horizontal direction than in the vertical direction.

According to the head-up display 100 according to the first embodiment, the image size of the display device 110 can be made smaller in the vertical direction where the focal length is short and made larger in the horizontal direction where the focal length is long. Therefore, even in a case where the virtual image I is inclined with respect to the line of sight of the observer D, it is possible to prevent an increase in the size of the display device 110 in the vertical direction and to reduce the size of the display device 110.

Second Embodiment

Next, a second embodiment will be described with reference to FIG. 4.

[2-1. Configuration]

Figure 4:
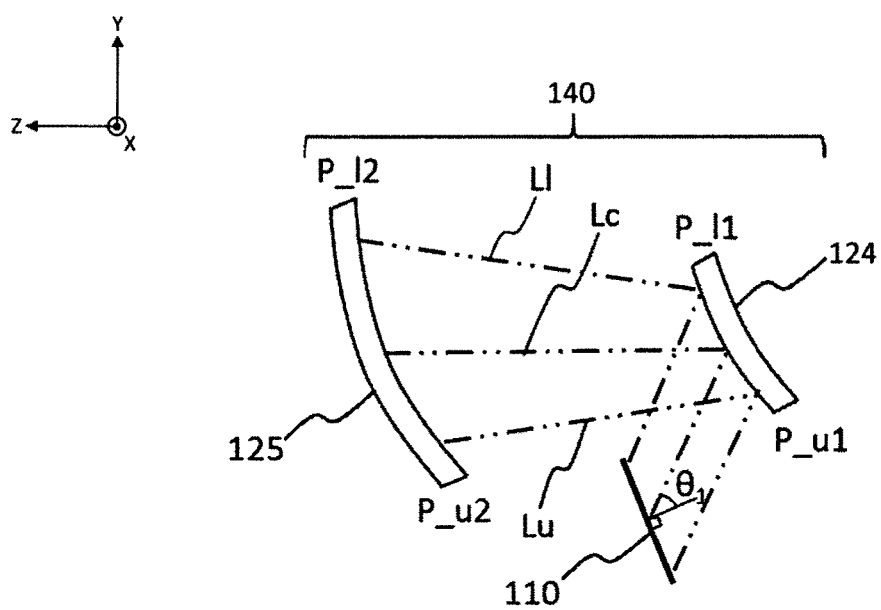
FIG. 4 is a diagram showing configurations of a display device and a projection optical system, of a head-up display according to a second embodiment.

FIG. 4 is a diagram showing configurations of the display device 110 and the projection optical system 140 in the head-up display 100 according to the second embodiment. As shown in FIG. 4, in the head-up display 100 of the present embodiment, a free-form surface mirror 124 is provided in place of the free-form surface lens 123 as the first optical element.

Also in the present embodiment, the free-form surface mirror 124 is formed to have a stronger diverging action in the horizontal direction than in the vertical direction. Further, the free-form surface mirror 125 is formed to have a stronger converging action in the horizontal direction indicated by chain double-dashed lines than in the vertical direction, as in the first embodiment.

With this configuration, in the vertical direction, a telephoto action by the free-form surface mirror 124 and the free-form surface mirror 125 becomes weaker and this leads to a short focal point. Therefore, the combined power can be increased. For this reason, the magnification is increased, and size in the vertical direction of the image displayed on the display device 110 can be reduced. Further, in the horizontal direction, a telephoto action by the free-form surface mirror 124 and the free-form surface mirror 125 becomes stronger and this leads to a long focal point. Therefore, the combined power can be reduced. For this reason, the magnification is lowered, and size in the horizontal direction of the image displayed on the display device 110 can be increased.

Also in the present embodiment, when power in the horizontal direction of the free-form surface mirror 124 is P1X' and power in the vertical direction of the free-form surface mirror 124 is P1Y', the free-form surface mirror 124 is formed to satisfy the following conditional expression (1)':

$$1.0<P1X'/P1Y'<1.5 \qquad (1)'$$

Further, when the power in the horizontal direction of the free-form surface mirror 125 is P2X and the power in the vertical direction of the free-form surface mirror 125 is P2Y, the free-form surface mirror 125 is designed to satisfy the following conditional expression (2):

$$1.0<P2X/P2Y<2.0 \qquad (2)$$

By using the projection optical system 140 as described above, the image size of the display device 110 can be made smaller in the vertical direction with a short focal length and can be made larger in the horizontal direction with a long focal length. Therefore, even in a case where the virtual image I is inclined with respect to the line of sight of the observer D, it is possible to prevent an increase in the size of the display device 110 in the vertical direction and to reduce the size of the display device 110.

Further, also in the present embodiment, the relationship between size of an image displayed by the display device 110 and a field of view is set as described below.

When the horizontal field of view of the virtual image in the present embodiment is XF, the vertical field of view of the virtual image is YF, the horizontal display size of the image on the display device 110 is XI, and the vertical display size of the image on the display device 110 is YI, the following conditional expression (3) is satisfied:

$$0.62<(XI\times YF)/(YI\times XF)<0.90 \qquad (3)$$

When the aspect ratio of the field of view is expressed by XF/YF and the aspect ratio of the display image is expressed by XI/YI, the conditional expression above is expressed as a ratio of the aspect ratio of the display image to the aspect ratio of the field of view. Hereinafter, the ratio will be referred to as "the ratio of the aspect ratios".

As described above, in the projection optical system 140 of the present embodiment, there is a difference in focal length between the vertical direction and the horizontal direction. The upper limit of the ratio of the aspect ratios is preferably set to 1. However, the closer the ratio of the aspect ratios is to 1, the larger the difference in focal length between the vertical direction and the horizontal direction, and the aberration characteristic limit is reached. Specifically, as the ratio of the aspect ratios becomes larger, the effect of eccentric astigmatism becomes larger. In view of the above, in the present embodiment, the upper limit of the ratio is set to 0.90 so that a virtual image with excellent image quality can be presented.

Further, when the ratio of the aspect ratios becomes small, the display device 110 becomes large. In view of the above, in the present embodiment, the lower limit of the ratio of the aspect ratios is set to 0.62, so as to prevent an increase in the size of the display device 110.

As described above, in the projection optical system 140 in the present embodiment, the free-form surface mirror 124 is configured to have a stronger diverging action in the horizontal direction than in the vertical direction, and the free-form surface mirror 125 is configured to have a stronger converging action in the horizontal direction than in the vertical direction. As a result, it is possible to provide the head-up display 100 capable of being downsized yet presenting the virtual image with excellent image quality, even in a case where the virtual image I is inclined with respect to the line of sight of the observer D.

[2-2. Advantageous Effect and the Like]

The head-up display 100 as an example of the head-up display according to the second embodiment displays an image as the virtual image I to the observer D. The head-up display 100 includes the display device 110 configured to display the image and the projection optical system 140 configured to enlarge and project the image. The projection optical system 140 includes the free-form surface mirror 124 and the free-form surface mirror 125 arranged in this order in the optical path from the image. The free-form surface mirror 124 has a stronger diverging action in the horizontal direction than in the vertical direction, and the free-form surface mirror 125 has a stronger converging action in the horizontal direction than in the vertical direction.

According to the head-up display 100 according to the second embodiment, the image size of the display device 110 can be made smaller in the vertical direction where the focal length is short and made larger in the horizontal direction where the focal length is long. Therefore, even in a case where the virtual image I is inclined with respect to the line of sight of the observer D, it is possible to prevent an increase in the size of the display device 110 in the vertical direction and to reduce the size of the display device 110.

In the first and second embodiments, the virtual image I is displayed along the road surface R. It is also possible to express a sense of depth by inclining the virtual image I with respect to the line of sight of the observer D by 45 degrees or more.

(Outline of Embodiment)

(1) The head-up display according to the present disclosure is a head-up display for displaying an image as a virtual image to an observer. The head-up display includes a display device configured to display the image, and a projection optical system configured to enlarge and project the image. The projection optical system includes a first optical element and a second optical element arranged in this order in an optical path from the image, the first optical element has a diverging action that is stronger in a horizontal direction than in a vertical direction, and the second optical element has a converging action that is stronger in the horizontal direction than in the vertical direction.

According to the head-up display of the present disclosure, the image size of the display device can be made smaller in the vertical direction where the focal length is short and made larger in the horizontal direction where the focal length is long. Therefore, even in a case where the virtual image is inclined with respect to the line of sight of the observer, it is possible to prevent an increase in the size of the display device in the vertical direction and to reduce the size of the display device.

(2) In the head-up display of (1), when a horizontal field of view of the virtual image is XF, a vertical field of view of the virtual image is YF, a horizontal display size of the image is XI, and a vertical display size of the image is YI, the following conditional expression (3) is satisfied:

$$0.62<(XI\times YF)/(YI\times XF)<0.90 \qquad (3).$$

Therefore, it is possible to provide the head-up display capable of being downsized yet presenting the virtual image with excellent image quality, even in a case where the virtual image is inclined with respect to the line of sight of the observer.

(3) In the head-up display of (1) or (2), a combined power of the first optical element and the second optical element is larger in the vertical direction than in the horizontal direction. Therefore, even in a case where the virtual image is inclined with respect to the line of sight of the observer, it is possible to prevent an increase in the size of the display device in the vertical direction and to reduce the size of the display device.

(4) In the head-up display of any one of (1) to (3), when power in the horizontal direction of the first optical element is P1X, and power in the vertical direction of the first optical element is P1y, the following conditional expression (1) is satisfied:

$$1.0<P1X/P1Y<1.5 \qquad (1).$$

Therefore, even in a case where the virtual image is inclined with respect to the line of sight of the observer, it is possible to prevent an increase in the size of the display device in the vertical direction and to reduce the size of the display device.

(5) In the head-up display of any one of (1) to (3), when power in the horizontal direction of the second optical element is P2X, and power in the vertical direction of the second optical element is P2Y, the following conditional expression (2) is satisfied:

$$1.0<P2X/P2Y<2.0 \qquad (2).$$

Therefore, even in a case where the virtual image is inclined with respect to the line of sight of the observer, it is possible to prevent an increase in the size of the display device in the vertical direction and to reduce the size of the display device.

(6) In the head-up display of any one of (1) to (5), the first optical element is a free-form surface lens. Therefore, the diverging action of the first optical element can be made larger in the horizontal direction than in the vertical direction, and, even in a case where the virtual image is inclined with respect to the line of sight of the observer, it is possible to prevent an increase in the size of the display device in the vertical direction and to reduce the size of the display device.

(7) In the head-up display of any one of (1) to (5), the first optical element is a free-form surface mirror. Therefore, the diverging action of the first optical element can be made larger in the horizontal direction than in the vertical direction, and, even in a case where the virtual image is inclined with respect to the line of sight of the observer, it is possible to prevent an increase in the size of the display device in the vertical direction and to reduce the size of the display device.

(8) In the head-up display of any one of (1) to (7), the first optical element has a diverging action. Therefore, the diverging action of the first optical element can be made larger in the horizontal direction than in the vertical direction, and, even in a case where the virtual image is inclined with respect to the line of sight of the observer, it is possible to prevent an increase in the size of the display device in the vertical direction and to reduce the size of the display device.

The present disclosure can be applied to a head-up display including a display device such as a liquid crystal display, and a projection optical system such as a free-form surface lens or a free-form surface mirror. Specifically, the present disclosure is applicable to a head-up display for a vehicle and the like.

What is claimed is:

1. A head-up display for displaying an image as a virtual image to an observer, the head-up display comprising:
   a display device configured to display the image; and
   a projection optical system configured to enlarge and project the image, wherein
   the projection optical system comprises a first optical element and a second optical element arranged in this order in an optical path from the image,
   the first optical element has a diverging action that is stronger in a horizontal direction than in a vertical direction,
   the second optical element has a converging action that is stronger in the horizontal direction than in the vertical direction,
   a combined power of the first optical element and the second optical element is larger in the vertical direction than in the horizontal direction, and
   the virtual image is inclined by 45 degrees or more with respect a line of sight of the observer to have a lower end close to the observer and an upper end far from the observer.

2. The head-up display according to claim 1, wherein when a horizontal field of view of the virtual image is XF, a vertical field of view of the virtual image is YF, a horizontal display size of the image is XI, and a vertical display size of the image is YI, a following conditional expression (3) is satisfied:

$$0.62 < (XI \times YF)/(YI \times XF) < 0.90 \qquad (3).$$

3. The head-up display according to claim 1, wherein the display device is inclined by a predetermined angle with respect to a reference light beam of the projection optical system to make an upper end side of the display device for displaying the lower end of the virtual image close to the projection optical system.

4. The head-up display according to claim 1, wherein when power in the horizontal direction of the first optical element is P1X, and power in the vertical direction of the first optical element is P1Y, a following conditional expression (1) is satisfied:

$$1.0 < P1X/P1Y < 1.5 \qquad (1).$$

5. The head-up display according to claim 1, wherein when power in the horizontal direction of the second optical element is P2X, and power in the vertical direction of the second optical element is P2Y, a following conditional expression (2) is satisfied:

$$1.0 < P2X/P2Y < 2.0 \qquad (2).$$

6. The head-up display according to claim 1, wherein the first optical element is a free-form surface lens.

7. The head-up display according to claim 1, wherein the first optical element is a free-form surface mirror.

8. The head-up display according to claim 1, wherein the first optical element has a diverging action.

9. The head-up display according to claim 1, wherein the virtual image is displayed along a road surface in front.

10. A moving object equipped with the head-up display according to claim 1.

* * * * *